(12) United States Patent
Yoon et al.

(10) Patent No.: US 12,525,612 B2
(45) Date of Patent: Jan. 13, 2026

(54) NEGATIVE ELECTRODE FOR LITHIUM SECONDARY BATTERY, METHOD FOR MANUFACTURING THE SAME, AND LITHIUM SECONDARY BATTERY INCLUDING THE SAME

(71) Applicants: LG ENERGY SOLUTION, LTD., Seoul (KR); KOREA ADVANCED INSTITUTE OF SCIENCE AND TECHNOLOGY, Daejeon (KR)

(72) Inventors: Jong Keon Yoon, Daejeon (KR); Sunwoo Hwang, Daejeon (KR); Hoejin Hah, Daejeon (KR); Jung Pil Lee, Daejeon (KR); Ju-Hyuk Lee, Daejeon (KR); Hee-Tak Kim, Daejeon (KR); Hyeokjin Kwon, Daejeon (KR)

(73) Assignees: LG ENERGY SOLUTION, LTD., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 513 days.

(21) Appl. No.: 17/912,567

(22) PCT Filed: Jul. 20, 2021

(86) PCT No.: PCT/KR2021/009356
§ 371 (c)(1),
(2) Date: Sep. 19, 2022

(87) PCT Pub. No.: WO2022/019622
PCT Pub. Date: Jan. 27, 2022

(65) Prior Publication Data
US 2023/0145094 A1    May 11, 2023

(30) Foreign Application Priority Data

Jul. 23, 2020  (KR) .................. 10-2020-0091886
Oct. 6, 2020   (KR) .................. 10-2020-0128634

(51) Int. Cl.
*H01M 4/587*   (2010.01)
*H01M 4/62*    (2006.01)
(Continued)

(52) U.S. Cl.
CPC ........... *H01M 4/587* (2013.01); *H01M 4/622* (2013.01); *H01M 10/052* (2013.01);
(Continued)

(58) Field of Classification Search
CPC .... H01M 4/587; H01M 50/534; H01M 4/622; H01M 10/052
(Continued)

(56) References Cited

U.S. PATENT DOCUMENTS

2011/0129701 A1* 6/2011 Seo ................. H01M 50/54
429/153
2012/0321947 A1* 12/2012 Goto ............... H01M 4/131
427/126.6
(Continued)

FOREIGN PATENT DOCUMENTS

CN  108258241 A    7/2018
CN  109980235 A *  7/2019 ............ H01M 10/05
(Continued)

OTHER PUBLICATIONS

Liu et al., MOF-Derived 3D Hollow Porous Carbon/Graphene Composites for Advanced Lithium-Ion Battery Anodes, Jul. 22, 2020, Journal of Solid State Chemistry, 290, pp. 1-4 (Year: 2020).*
(Continued)

*Primary Examiner* — Jonathan G Leong
*Assistant Examiner* — John S Medley
(74) *Attorney, Agent, or Firm* — Birch, Stewart, Kolasch & Birch, LLP

(57) ABSTRACT

Disclosed is a negative electrode for a lithium secondary battery that enables the provision of a lithium secondary
(Continued)

battery having a higher energy density and can fundamentally prevent the electrolyte decomposition reaction and the lithium dendrite formation, a method for manufacturing the same and a lithium secondary battery including the same.

16 Claims, 9 Drawing Sheets

(51) Int. Cl.
  *H01M 10/052* (2010.01)
  *H01M 50/534* (2021.01)
  *H01M 4/02* (2006.01)
(52) U.S. Cl.
  CPC .... *H01M 50/534* (2021.01); *H01M 2004/021* (2013.01); *H01M 2004/027* (2013.01)
(58) Field of Classification Search
  USPC .................................................... 429/231.8
  See application file for complete search history.

(56) References Cited

U.S. PATENT DOCUMENTS

| | | | | |
|---|---|---|---|---|
| 2013/0095389 | A1* | 4/2013 | Bhardwaj | H01M 4/382 |
| | | | | 429/231.95 |
| 2016/0056464 | A1 | 2/2016 | Yagishita et al. | |
| 2017/0047588 | A1 | 2/2017 | Mukherjee et al. | |
| 2017/0104209 | A1 | 4/2017 | Son et al. | |
| 2017/0110719 | A1 | 4/2017 | Wang et al. | |
| 2017/0117551 | A1 | 4/2017 | Choi et al. | |
| 2017/0271674 | A1 | 9/2017 | Cheng et al. | |
| 2018/0069235 | A1 | 3/2018 | Lee et al. | |
| 2018/0358618 | A1 | 12/2018 | Tour et al. | |
| 2019/0341603 | A1 | 11/2019 | Yoon et al. | |
| 2020/0220136 | A1 | 7/2020 | Wang et al. | |
| 2021/0218016 | A1 | 7/2021 | Chae et al. | |
| 2023/0065906 | A1* | 3/2023 | Yoon | H01M 4/587 |

FOREIGN PATENT DOCUMENTS

| | | | | |
|---|---|---|---|---|
| CN | 110649267 | A | | 1/2020 |
| CN | 111180798 | A | * | 5/2020 ........ H01M 10/0525 |
| JP | 2017-517467 | A | | 6/2017 |
| JP | 2017-533541 | A | | 11/2017 |
| KR | 10-2003-0014263 | A | | 2/2003 |
| KR | 10-2012-0054243 | A | | 5/2012 |
| KR | 10-2015-0138265 | A | | 12/2015 |
| KR | 10-2015-0143372 | A | | 12/2015 |
| KR | 10-2016-0014916 | A | | 2/2016 |
| KR | 10-2016-0052351 | A | | 5/2016 |
| KR | 10-2016-0100326 | A | | 8/2016 |
| KR | 10-2018-0027022 | A | | 3/2018 |
| KR | 10-2018-0073442 | A | | 7/2018 |
| KR | 10-2019-0042335 | A | | 4/2019 |
| KR | 10-2019-0126712 | A | | 11/2019 |
| KR | 10-2020-0000667 | A | | 1/2020 |
| KR | 10-2020-0005225 | A | | 1/2020 |
| KR | 10-2020-0087438 | A | | 7/2020 |

OTHER PUBLICATIONS

Wang et al., Advanced Engineering of Nanostructured Carbons for Lithium-Sulfur Batteries, May 19, 2015, Nano Energy, 15, p. 421 (Year: 2015).*
Cheng et al., Graphene Fiber: A New Material Platform for Unique Applications, 2014, NPG Asia Materials, p. 2 (Year: 2014).*
CN 110649267 A mach. trans. (Year: 2020).*
CN 109980235 A mach. trans. (Year: 2020).*
CN 111180798 A mach. trans. (Year: 2020).*
Kim et al, "Functionality of Dual-Phase Lithium Storage in a Porous Carbon Host for Lithium-Metal Anode," Advanced Functional Materials, Mar. 9, 2020, 1910538, pp. 1-22.
Li et al., "Improved Lithium Deposition on Silver Plated Carbon Fiber Paper," Nano Energy, vol. 66, Sep. 28, 2019, 104144, pp. 1-5.
Wang et al., "Regulating Uniform Li Plating/Stripping via Dual-Conductive Metal-Organic Frameworks for High-Rate Lithium Metal Batteries," Advanced Functional Materials, Feb. 26, 2020, 2000786, pp. 1-10.
Extended European Search Report dated Jul. 25, 2023 for Application No. 21846958.3.
Zhou et al., "Regulating Lithium Nucleation and Deposition via MOF-Derived Co@C-Modified Carbon Cloth for Stable Li Metal Anode", Adv. Funct. Mater., vol. 30, 2020, 1909159 pp. 1-10.
Chen et al., "Nitrogen-Doped Carbon for Sodium-Ion Battery Anode by Self-Etching and Graphitization of Bimetallic MOF-Based Composite", Chem., 2017, vol. 3, Issue. 1, pp. 152-163, Total 13 pages.
Cheng et al., "Implantable Solid Electrolyte Interphase in Lithium-Metal Batteries", the Chemistry journal of Science 2, 2017, pp. 258-270, Total 14 pages.
Cheng et al., "Sulfurized Solid Electrolyte Interphases with a Rapid Li$^+$Diffusion on Dendrite-Free Li Metal Anodes", Energy Storage Materials 10, 2017, pp. 199-205, Total 24 pages.
International Search Report (PCT/ISA/210) issued in PCT/KR2021/009356 mailed on Oct. 27, 2021.
Lee et al., "A Simple Composite Protective Layer Coating That Enhances the Cycling Stability of Lithium Metal Batteries", Journal of Power Sources, 2015, pp. 103-108, Total 37 pages.
Li et al., "The synergetic effect of lithium polysulfide and lithium nitrate to prevent lithium dendrite growth", Nature communication, 6:7436, 2015, pp. 1-8.
Mukherjee et al., "Defect-induced plating of lithium metal within porous graphene networks", Nature communications, 2014, vol. 5, pp. 37102014, 1-10.
Zhu et al., "A lightweight and low-cost electrode for lithium-ion batteries derived from paper towel supported MOF arrays", Chem. Commun., 2020, vol. 56, pp. 5847-5850, Total 8 pages.
Zhu et al., "Dendrite-Free Metallic Lithium in Lithiophilic Carbonized Metal-Organic Frameworks", Advanced energy materials, 2018, vol. 8, No. 18, pp. 1703505(1)-1703505(7).
Song et al., "Polysulfide Rejection Layer from Alpha-Lipoic Acid for High Performance Lithium-Sulfur Battery", Journal of Materials Chemistry A, 2014, pp. 1-8 (9 pages total).

* cited by examiner

[FIG. 1]
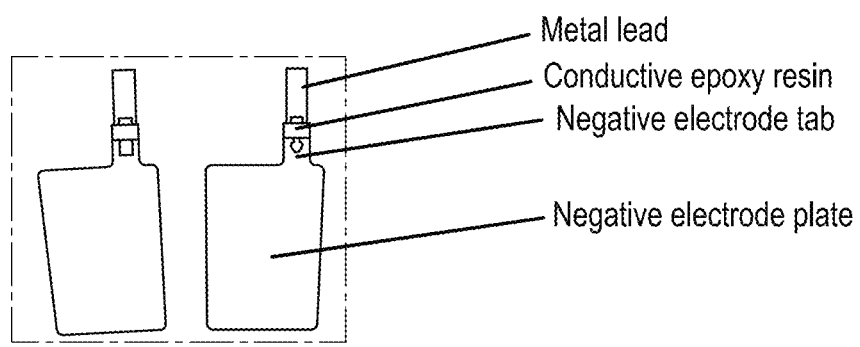
[FIG. 2a]
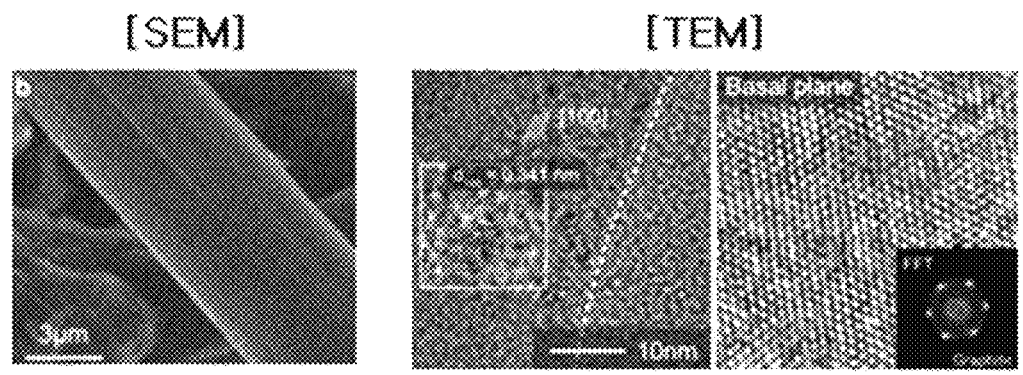
[FIG. 2b]
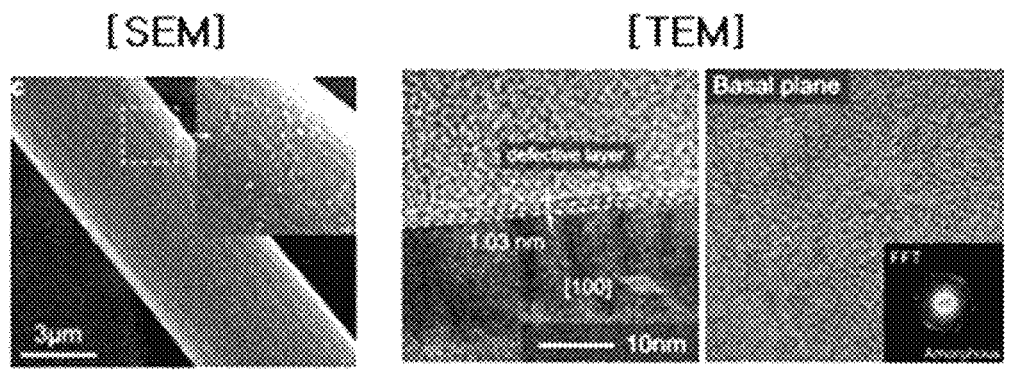

[FIG. 3a]
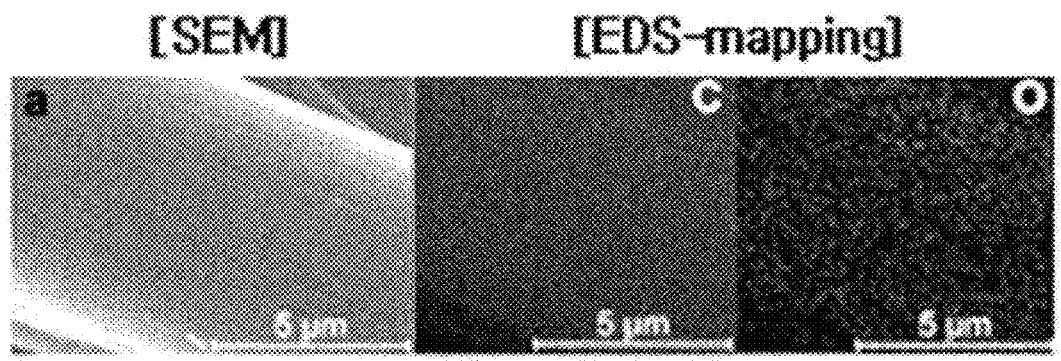
[FIG. 3b]
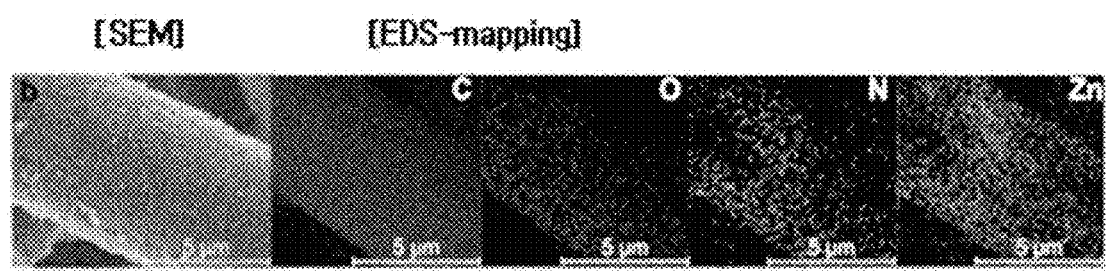
[FIG. 3c]
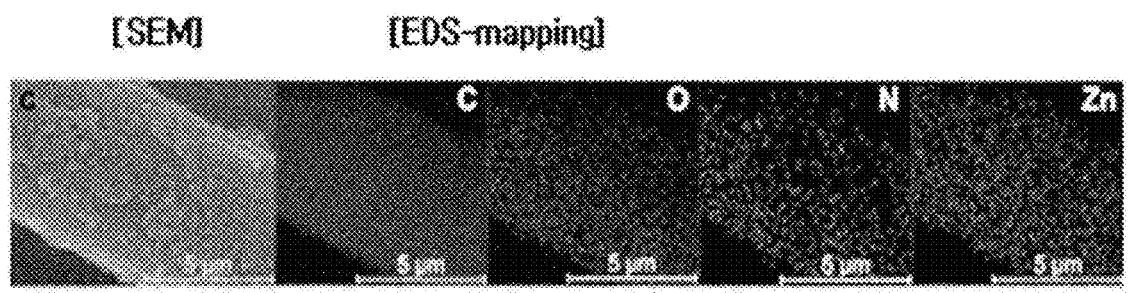

[FIG. 4]
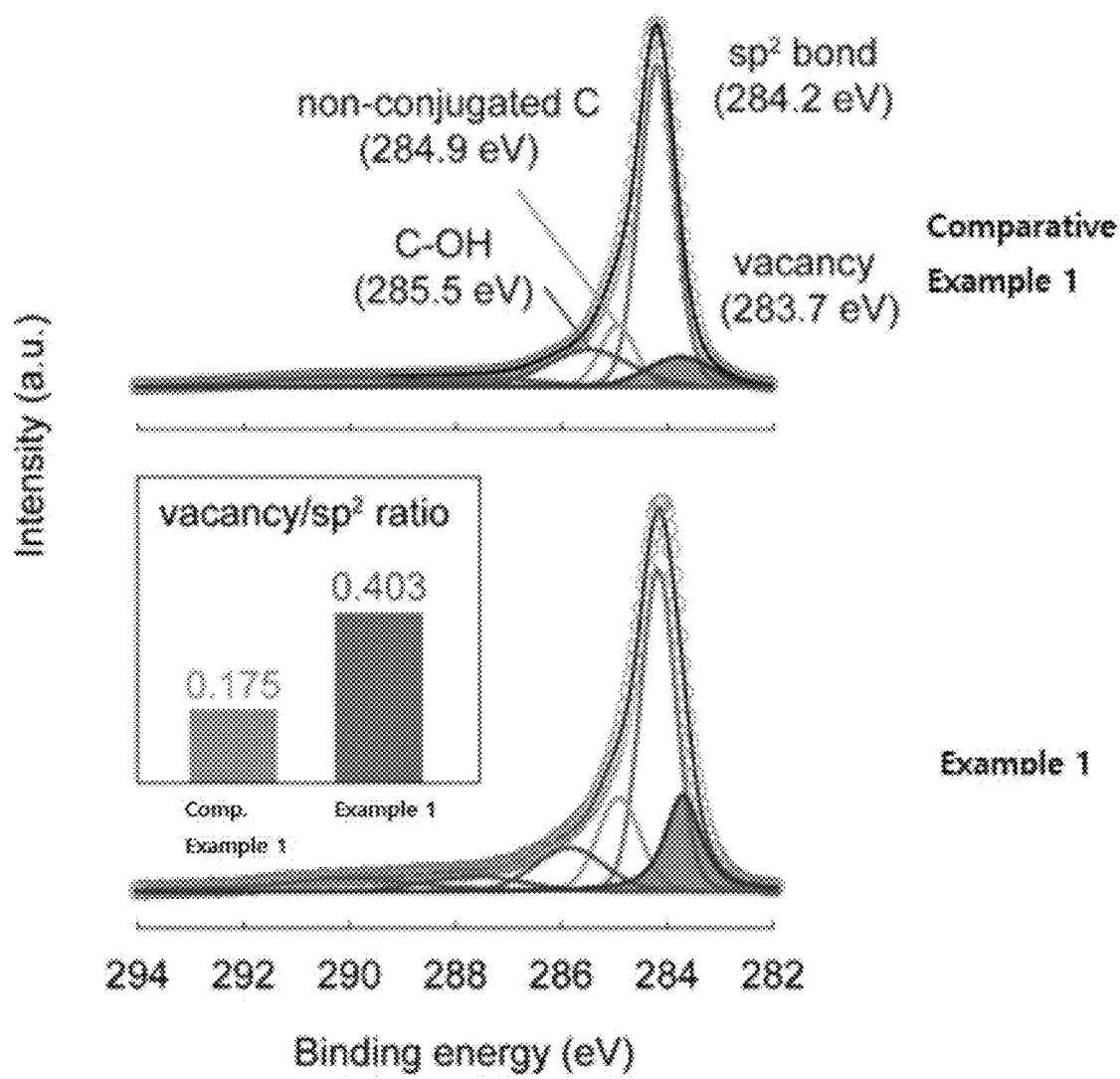

[FIG. 5]
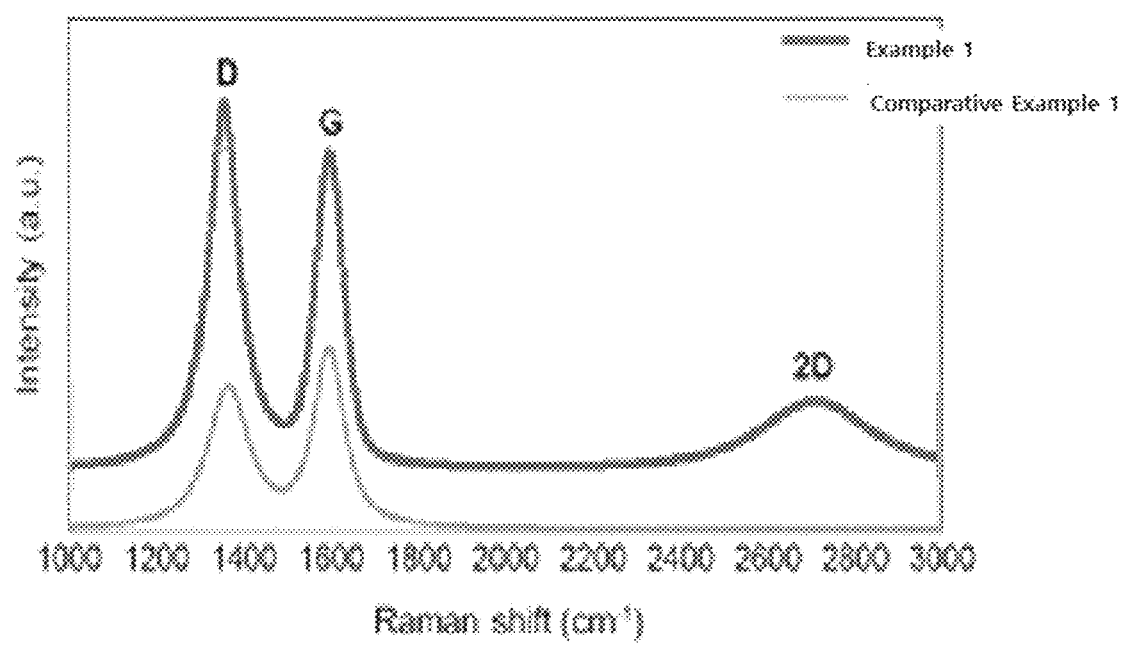

[FIG. 6]
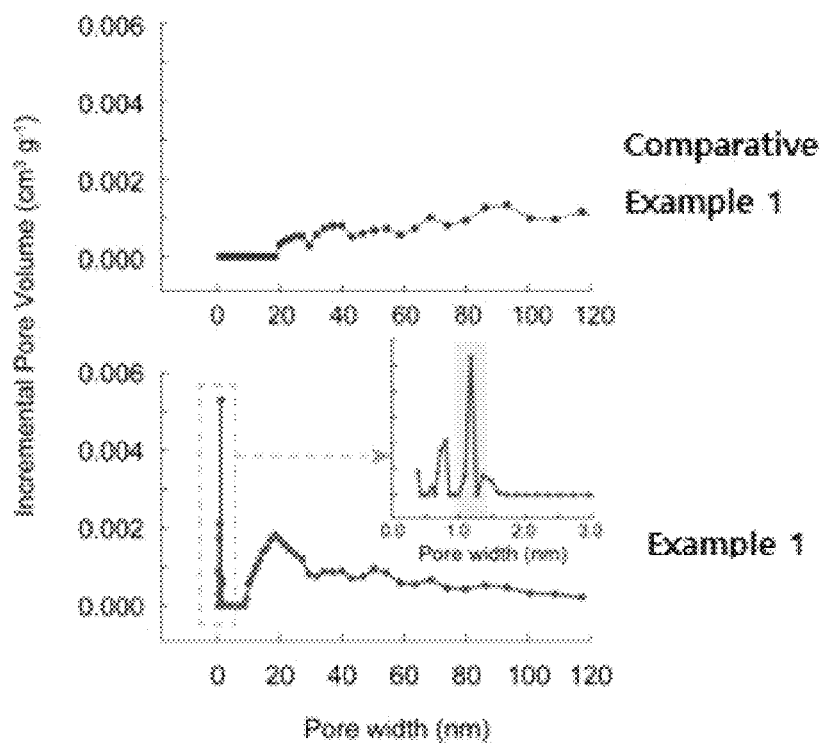

[FIG. 7]
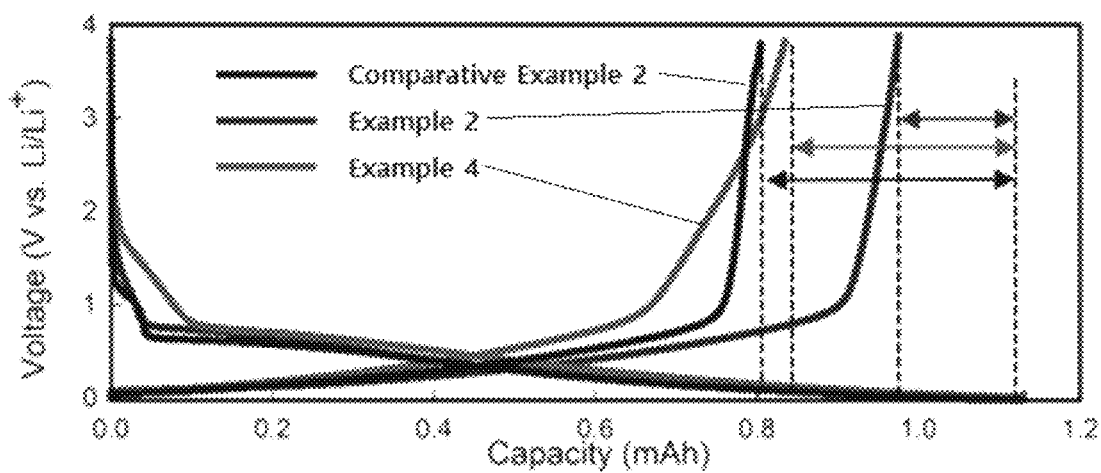

[FIG. 8a]
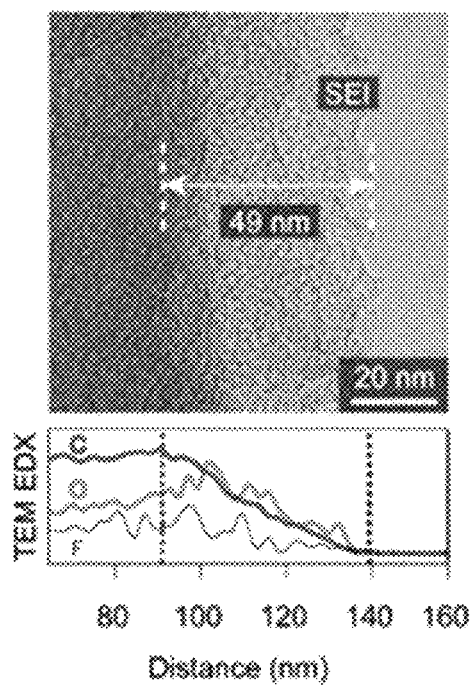

[FIG. 8b]
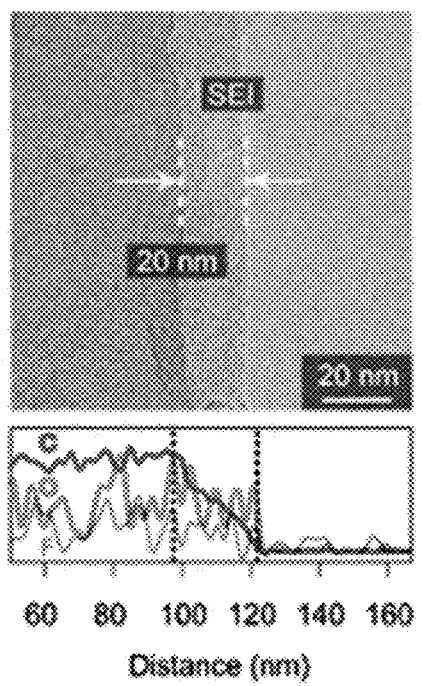
[FIG. 9a]
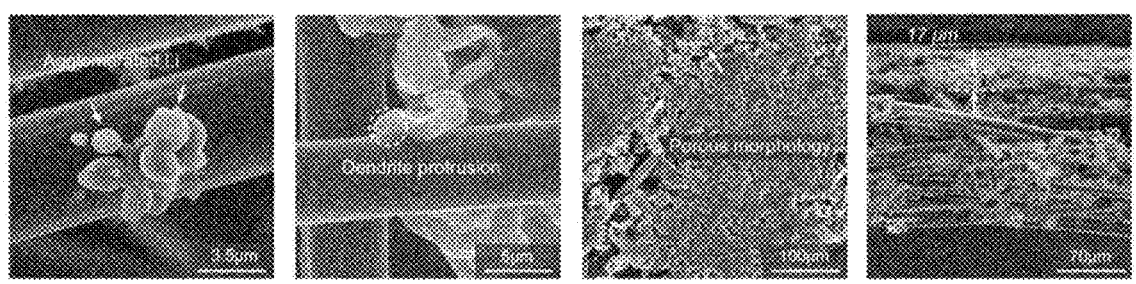
[FIG. 9b]
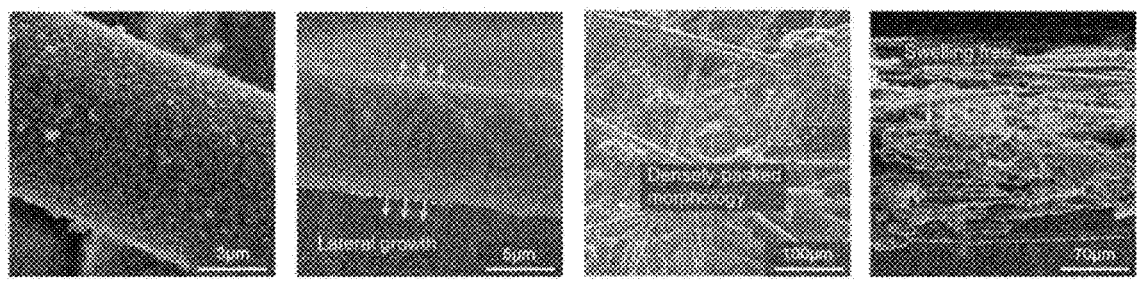

[FIG. 10a]
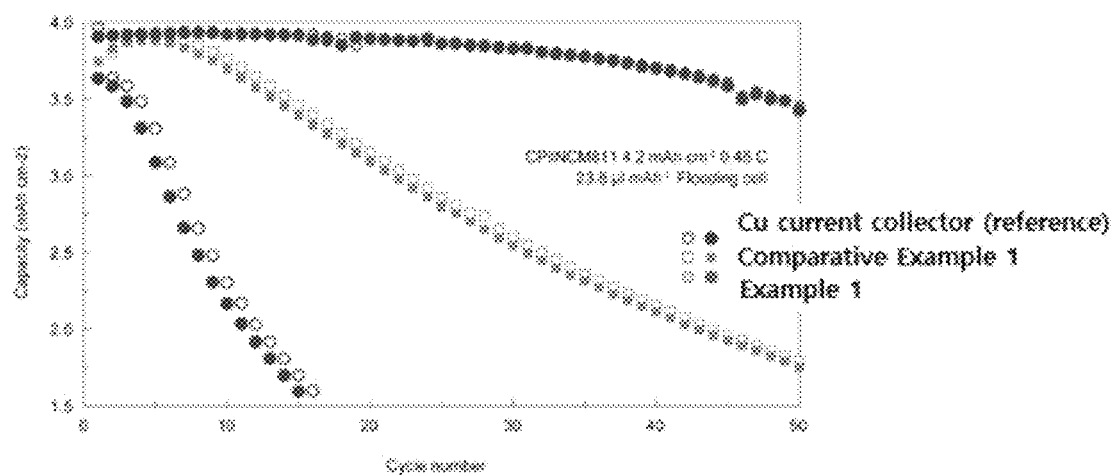
[FIG. 10b]
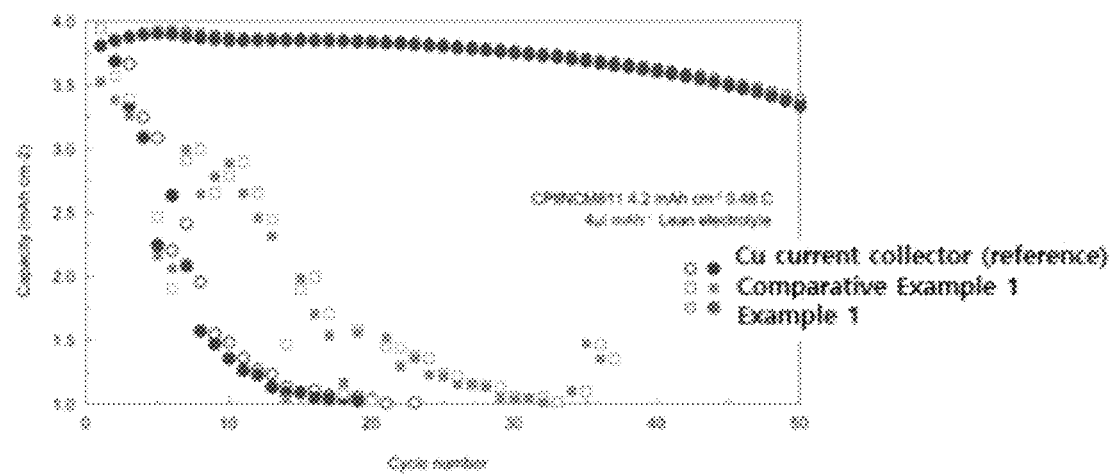

NEGATIVE ELECTRODE FOR LITHIUM SECONDARY BATTERY, METHOD FOR MANUFACTURING THE SAME, AND LITHIUM SECONDARY BATTERY INCLUDING THE SAME

TECHNICAL FIELD

Cross Citation with Related Application(s)

This application claims the benefit of Korean Patent Application No. 10-2020-0091886 filed on Jul. 23, 2020 and Korean Patent Application No. 10-2020-0128634 filed on Oct. 6, 2020 in the Korean Intellectual Property Office, the disclosures of which are incorporated herein by reference in their entirety.

The present disclosure relates to a negative electrode for a lithium secondary battery that enables the provision of a lithium secondary battery having a higher energy density and can fundamentally prevent the electrolyte decomposition reaction and the lithium dendrite formation, a method for manufacturing the same and a lithium secondary battery including the same.

BACKGROUND

Lithium secondary battery has excellent performance such as high energy density and long life characteristics, and is currently used in most portable electronic devices, and further, is rapidly expanding its application area to electric vehicles, large-capacity energy storage devices, and the like.

Due to the expansion of the application area of the lithium secondary battery, the development of a next-generation lithium secondary battery having a higher energy density than that of a conventional lithium ion battery is continuously required. As the next-generation lithium secondary battery having such high capacity and high energy characteristics, interest in next-generation batteries such as a lithium metal battery, a lithium sulfur battery, or a lithium air battery using a lithium metal negative electrode or the like is significantly increasing. For reference, the lithium metal negative electrode has a high theoretical capacity (3860 mAh/g) and a low standard reduction potential (−3.040 V vs. SHE) and thus, it is possible to realize high capacity and high energy density per volume/weight.

However, in the case of the next-generation battery to which a lithium metal negative electrode is applied, such as a lithium metal battery, at the interface between the negative electrode and the electrolyte, a solid electrolyte interphase (SEI) is formed and consumed according to the principle described later, an electrolyte reduction decomposition reaction occurs, and lithium dendrite in the form of dendrite protrusion is formed, which causes the problem of inducing low coulombic efficiency of the battery.

More specifically, during the electrochemical cycle driving process of the battery, dendritic lithium dendrites and dead lithium in the lithium metal negative electrode are grown and formed three-dimensionally (e.g., in the form of projections) from the surface of the negative electrode, for example, a lithium metal active material layer formed as an additional thin film, which may cause large loss of active material. Furthermore, due to its high reactivity, lithium metal reacts with the electrolyte solution and the residual moisture to form a solid electrolyte interphase (SEI) on the surface of the negative electrode, and a process, by which the surface area of the electrode increases due to the formation of lithium dendrite and dead lithium, and thus the solid electrolyte interphase cracks and re-forms, is repeated. Therefore, continuous consumption of lithium metal and electrolyte occurs due to the electrolytic reduction decomposition reaction that occurs in such a process, which can lead to low coulombic efficiency and short cycle life of the lithium metal negative electrode. In addition, when the protrusion-shaped lithium dendrite penetrates through the separator and grows, an internal short circuit may occur, which may cause a problem of fire or explosion.

Furthermore, if a lithium metal thin film with a thickness of tens to hundreds of micrometers, which is usually intercalated in the cell assembling step, is not used, the stable source of lithium element disappears and thus, the above-mentioned electrolyte decomposition reaction and dendrite formation reaction may be further exacerbated.

Therefore, there is a continuous need to develop a next-generation lithium secondary battery that exhibits higher energy density and associated high capacity and high energy characteristics, while effectively suppressing the electrolyte decomposition reaction, the lithium dendrite growth and the like caused by the three-dimensional formation of the lithium metal thin film as the active material layer.

DETAILED DESCRIPTION OF THE INVENTION

Technical Problem

It is an object of the present disclosure to provide a negative electrode for a lithium secondary battery that enables the provision of a lithium secondary battery having a higher energy density and can fundamentally prevent the electrolyte decomposition reaction and the lithium dendrite formation, and a method for manufacturing the same.

It is another object of the present disclosure to provide a lithium secondary battery including the negative electrode, which not only has high capacity and high energy characteristics in a level equal to or higher than those of conventional lithium metal batteries, but also fundamentally suppresses the electrolyte decomposition reaction, the lithium dendrite formation and the like due to the application of a lithium metal thin film to a negative electrode.

Technical Solution

According to one aspect of the present disclosure, there is provided a negative electrode for a lithium secondary battery comprising: a crystalline carbon layer; an amorphous carbon layer having a network structure on the crystalline carbon layer; and a lithium ion or lithium carbide compound intercalated into the amorphous carbon layer, and a lithium metal electrodeposited around the lithium ion or lithium carbide compound.

According to another aspect of the present disclosure, there is provided a method for manufacturing the negative electrode of the present disclosure, the method comprising:

a step of subjecting a crystalline carbon fabric containing plural carbon fibers to an oxygen plasma treatment to oxidize the surface;

a step of reacting the surface-oxidized crystalline carbon fabric, a nitrogen precursor and a metal precursor to form a carbon fabric coated with a metal organic framework (MOF);

a step of calcinating the carbon fabric coated with the metal organic framework at a temperature of 700° C. or more to carbonize the carbon fabric; and a step of electrochemically reacting the carbonized carbon fabric within the lithium salt-containing electrolyte, bonding the lithium ion or lithium carbide compound onto the carbonized carbon fabric and electrodepositing a lithium metal around the lithium ion or lithium carbide compound.

According to yet another aspect of the present disclosure, there is provided a lithium secondary battery comprising: a positive electrode containing a positive electrode current collector and a lithium composite oxide-based positive electrode active material layer formed on the positive electrode current collector; the negative electrode of the present disclosure; and a separator between the positive electrode and the negative electrode; and an electrolyte.

Advantageous Effects

The negative electrode of the present disclosure not only excludes or minimizes a separate active material layer formed three-dimensionally, such as a separate lithium metal thin film, but also forms and includes an amorphous carbon layer of a network structure including a carbon defect structure formed of electron-deficient carbon atoms by chemically treating a crystalline carbon layer through a predetermined process.

By the formation of an amorphous carbon layer containing such a carbon defect structure, an active material layer such as a lithium metal thin film formed in the form of a three-dimensional additional thin film in an existing lithium metal battery or the like can be eliminated or reduced. Therefore, it is possible to fundamentally suppress the formation and growth of lithium dendrites and dead lithium from such a lithium metal thin film or the like. Further, as the carbon defect structure in the amorphous carbon layer functioning as the active material layer is formed of a plurality of electron-deficient carbon atoms, the Fermi level is lowered to the valence band and thus, the electrolytic reduction decomposition reaction can be fundamentally suppressed.

In addition to this, in the amorphous carbon layer, as a plurality of electron-deficient carbon atoms are included in the carbon defect structure, a plurality of lithium ions and/or lithium compounds containing them can be intercalated while donating electrons to these carbon atoms. Further, by using such lithium ions and the like as nuclei, lithium metal can be uniformly electrodeposited around them. Therefore, such amorphous carbon layer can induce uniform lithium electrodeposition formed two-dimensionally on the same plane, and as a result, can function as an active material layer having a lithium ion source.

Therefore, when the negative electrode of the present disclosure is applied, it is possible to provide a battery having a high capacity and high energy characteristics in a level equal to or higher than those of a conventional lithium metal battery or the like, while fundamentally suppressing the electrolytic reduction decomposition reaction and the lithium dendrite growth caused by the lithium metal thin film in the form of an additional three-dimensional thin film. Such a battery can exhibit excellent cell performance and life characteristics, and can be very suitably used as a next-generation battery applied to an electric vehicle or the like.

BRIEF DESCRIPTION OF THE DRAWINGS

FIG. 1 is an image showing an example of a negative electrode for a lithium secondary battery according to one embodiment;

FIGS. 2a and 2b are diagrams showing the results of SEM and TEM analysis of the surfaces of the negative electrodes for lithium secondary batteries manufactured in Comparative Example 1 and Example 1, respectively;

FIGS. 3a to 3c are diagrams showing the analysis results along with the corresponding SEM images, after elemental analysis of a carbon paper and a negative electrode by EDS, for each manufacturing step of Example 1;

FIG. 4 is a diagram showing the results of XPS analysis of the negative electrodes formed in Comparative Example 1 and Example 1, respectively;

FIG. 5 is a diagram showing the results of Raman spectrum analysis of the negative electrodes formed in Comparative Example 1 and Example 1, respectively;

FIG. 6 is a diagram showing the results of BET analysis of the electrode surfaces of Example 1 and Comparative Example 1.

FIG. 7 is a graph showing the results of evaluating the degree of electrolyte decomposition reaction using the lithium secondary batteries of Comparative Examples 2, and Examples 2 and 4;

FIGS. 8a and 8b are diagrams showing the results of TEM-EDX analysis of the electrode surface after the first cycle in Experimental Example 4, respectively, in order to evaluate the degree of electrolyte decomposition reaction in the batteries of Comparative Example 2 and Example 2;

FIGS. 9a and 9b are diagrams showing the results of SEM analysis of the electrode surface states of Comparative Example 1 and Example 1 after lithium ion intercalation and lithium metal electrodeposition in the batteries of Comparative Example 2 and Example 2; and FIGS. 10a and 10b are diagrams showing the results of cell performance evaluation of the lithium secondary batteries of Example 2 and Comparative Example 2.

DETAILED DESCRIPTION OF THE EMBODIMENTS

Throughout the description, when a part is referred to as "including" a certain component, it means that the component may further include other components, without excluding the other components, unless otherwise stated. The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. The term "a step of doing something" or "a step of something" used throughout this specification does not mean a step for something.

Throughout the description, the term "combinations of" included in Markush type description means mixture or combination of one or more selected from a group consisting of components described in Markush type and thereby means that the disclosure includes one or more selected from the Markush group.

Based on the above definition, embodiments of the present disclosure will be described in detail. However, these embodiments are presented for illustrative purposes only, and the present disclosure is not limited thereby, and the present disclosure is only defined by the claims described below.

Negative Electrode for Lithium Secondary Battery

According to one embodiment of the present disclosure, there is provided a negative electrode for a lithium secondary battery comprising: a crystalline carbon layer; an amorphous carbon layer having a network structure formed on the crystalline carbon layer; and a lithium ion or lithium carbide compound intercalated into the amorphous carbon layer, and a lithium metal electrodeposited around the lithium ion or lithium carbide compound.

The negative electrode of the embodiment is manufactured by subjecting the surface of the crystalline carbon fabric providing the crystalline carbon layer to a plasma oxidation treatment, and proceeding with surface coating of a metal organic framework (MOF) and carbonization thereof, similarly to a method described later.

As a result of such chemical treatment, a large number of electron-deficient carbon atoms are formed on the crystalline carbon layer, and also an amorphous carbon layer having a network structure including a carbon defect structure containing these electron-deficient carbon atoms can be formed.

Further, in the amorphous carbon layer, while the metal organic framework is carbonized, a large number of nanopores (vacancies) ranging in diameter from of 0.5 to 2 nm, or 0.8 to 1.5 nm, or 1.0 to 1.2 nm may be present in the carbon defect structure.

For reference, the non-crystalline properties of the amorphous carbon layer, the formation of a carbon defect structure (formation of electron-deficient carbon atoms), and the formation of a plurality of nanopores can be confirmed through transmission electron microscopy (TEM) analysis, X-ray photoelectron spectroscopy (XPS) analysis, Raman spectrum analysis, and BET analysis described later.

As described above, as a high-density carbon defect structure including plural electron-deficient carbon atoms is formed in the amorphous carbon layer, the Fermi level of the electrode may be lowered to the valence band. As a result, the electrolytic reduction decomposition reaction on the surface of the electrode can be fundamentally suppressed.

Further, in the amorphous carbon layer, a large number of electron-deficient carbon atoms are included in the carbon defect structure, and a large number of nanopores having a size of 0.5 to 2 nm, more specifically, 1.0 to 1.2 nm, are formed. Therefore, in the amorphous carbon layer, electrons are donated from the conduction band of lithium, which serves to donate electrons to the carbon atoms, to the valence band of the carbon defect structure, and lithium derived from a large number of lithium ions and/or a lithium compound containing the same (e.g., lithium carbide compounds in the form of $Li_3C_8$), etc., can be well adsorbed and bonded to the electron-deficient carbon atoms and intercalated. In addition, the lithium ions or the like intercalated into this way function as a kind of nucleus, and lithium metal can be uniformly electrodeposited around the carbon defect structure centering on the lithium ions and the like.

The lithium ions and the like, and lithium metal electrodeposited around them can be intercalated and formed two-dimensionally into the plurality of nanopores in one example, and can act as a lithium ion source for the negative electrode. Therefore, in the negative electrode of one embodiment, the lithium ion source may be included two-dimensionally on the same plane as (or inside) the amorphous carbon layer. Therefore, this amorphous carbon layer itself can function as an active material layer having a lithium ion source contained in a two-dimensional plane, and as a result, the addition of a lithium metal thin film formed in the form of a three-dimensional additional thin film can be eliminated or significantly reduced.

As described above, while reducing the addition of a lithium metal thin film in the form of a three-dimensional additional thin film, the lithium ion source can be formed two-dimensionally in the carbon defect structure in the amorphous carbon layer, which make it possible to fundamentally suppress the formation and growth of lithium dendrites and dead lithium from a separate lithium metal thin film or the like additionally formed on the negative electrode.

It was confirmed that the negative electrode of one embodiment can fundamentally suppress the electrolyte decomposition reaction, the lithium dendrite growth and the like by the above-mentioned technical principle, and also a lithium secondary battery including such a negative electrode can have high capacity and high energy characteristics in a level equal to or higher than those of a conventional lithium metal battery.

Thus, when the negative electrode of one embodiment is applied, the problems caused by the electrolyte decomposition reaction and the lithium dendrite growth can be fundamentally suppressed and also higher capacity and high energy characteristics can be realized, and therefore, it can be very suitably used as a next-generation battery applicable to electric vehicles and the like.

On the other hand, various characteristics of the above-mentioned amorphous carbon layer, for example, non-crystallinity, the formation of a carbon defect structure (formation of electron-deficient carbon atoms) and the formation of plural nanopores may be confirmed by proceeding TEM analysis, XPS analysis, Raman spectrum analysis, and BET analysis on the surface of the negative electrode, for example, an amorphous carbon layer.

First, it can be confirmed through the results of TEM analysis that the amorphous carbon layer is formed of disordered and non-crystalline carbon atoms. Further, through the TEM images, it can be confirmed that it is formed in the form of a plurality of graphene layers having a thickness of about 1 to 100 nm, or about 2 to 70 nm, and that it is formed in the form of a plurality of defective layers.

Further, when the amorphous carbon layer was subjected to XPS analysis, it can be confirmed that a large number of nanopores (vacancies) were formed due to the carbonization process after the formation of the metal organic framework in the manufacturing process. Further, from the results of XPS analysis, a separate peak derived from a carbon defect structure containing electron-deficient carbon atoms, for example, the nanopores, can be confirmed. In particular, the intensity ratio of a separate peak from such a carbon defect structure divided by a peak from a carbon having a sp2 orbital hybridization structure (a normal carbon having no electron-deficient state) is 0.3 or more, or 0.35 to 0.50, or 0.4 to 0.45, which confirms that electron-deficient carbon atoms and carbon defect structures including them are formed in a considerable proportion and at a high density.

Further, through the results of Raman spectrum analysis of the amorphous carbon layer, it can be confirmed that a peak of 1500 $cm^{-1}$ or less, or 1100 to 1500 $cm^{-1}$ derived from the carbon defect structure (D band; a peak derived from electron-deficient carbons of the carbon defect structure) exhibits an intensity equal to or greater than the peak observed at more than 1500 $cm^{-1}$ and 2000 $cm^{-1}$ or less (G band; a peak derived from normal carbon having a graphitic structure). More specifically, the intensity ratio defined as the peak of the D band/the peak of the G band may be 1 or more, or 1 to 1.5. or 1.1 to 1.3.

Even through the results of Raman spectrum analysis, it can be confirmed that electron-deficient carbon atoms and carbon defect structures including them are formed in a considerable proportion and at high density on the amorphous carbon layer contained in the negative electrode of the one embodiment.

In addition, from the results of Raman spectrum analysis of the amorphous carbon layer, an additional broad peak may be confirmed in a region of 2500 cm$^{-1}$ or more, or 2500 to 2900 cm$^{-1}$, or 2600 to 2800 cm$^{-1}$. From this, it can be confirmed that the amorphous carbon layer may have a shape including a plurality of carbon layers.

In addition, the formation of a plurality of nanopores contained in the amorphous carbon layer can be confirmed even through BET surface analysis using nitrogen adsorption, and specific analysis results thereof are also described in Test Examples described later.

As described above, in the negative electrode of one embodiment, since a carbon defect structure including plural nanopores and electron-deficient carbon atoms is formed at a high density, lithium ions and/or lithium compounds can be two-dimensionally intercalated through the carbon defect structure and nanopores, and the lithium metal electrode-posited around such lithium ions or the like may be two-dimensionally included on the amorphous carbon layer. The lithium ions and the like, and the lithium metal may function as a lithium ion source for the negative electrode.

As described above, while not applying or greatly reducing the lithium metal thin film, etc., which is additionally formed in the form of a three-dimensional separate thin film on the negative electrode, the amorphous carbon layer includes a high-density lithium ion source that is two-dimensionally grown and formed therein, and can function as an active material layer by itself, so that the lithium secondary battery including the negative electrode of one embodiment can exhibit high capacity and high energy characteristics comparable to or higher than those of a conventional lithium metal battery. Furthermore, problems, such as lithium dendrite growing three-dimensionally outside the electrode from the lithium metal thin film formed in the form of a separate thin film, or the additional lithium metal thin film causing a reduction decomposition reaction of electrolytes, can also be fundamentally suppressed, whereby the lithium secondary battery including the negative electrode of one embodiment can be very suitably used as a next-generation battery that fundamentally solves the problems involved in the existing lithium metal battery or the like.

On the other hand, in the negative electrode of the above-mentioned one embodiment, as the crystalline carbon layer supporting the amorphous carbon layer is formed from a crystalline carbon fabric, and the like, it includes a plurality of carbon fibers, and may have a thickness of 1 to 50 μm, or 2 to 30 μm, or 1 to 10 μm. Thereby, the negative electrode can exhibit appropriate mechanical and electrochemical properties.

This crystalline carbon layer can function as a kind of negative electrode current collector while supporting the amorphous carbon layer functioning as the active material layer, whereby in the negative electrode of one embodiment, it is also possible to omit a separate metal current collector.

However, the negative electrode of one embodiment may include only a crystalline carbon layer functioning as the current collector and an amorphous carbon layer functioning as an active material layer including the lithium ion source described above, but additionally, it can further include a metal current collector such as a copper current collector, a nickel current collector, or a stainless (SUS) current collector for supporting the crystalline carbon layer. Since such an additional metal current collector may follow the configuration of a metal current collector in an electrode of a general lithium secondary battery, an additional description thereof will be omitted.

Meanwhile, FIG. 1 is an image showing an example of the negative electrode for a lithium secondary battery of the one embodiment described above. Referring to FIG. 1, the negative electrode of one embodiment includes a negative electrode plate including the crystalline carbon layer, the amorphous carbon layer, the lithium ion or lithium carbide compound, and the lithium metal, and may include a negative electrode tab protruding from the negative electrode plate. At this time, the negative electrode tab is integrated with the negative electrode plate, and can be formed in a shape including the same crystalline carbon layer and amorphous carbon layer as the negative electrode plate.

However, according to the example of such a negative electrode, as the negative electrode plate and the negative electrode tab protruding therefrom are composed of only the above-mentioned carbon layer, the bondability to a general metal lead may be deteriorated. That is, in the past, a welding method was mainly applied for bonding the negative electrode tab and the metal lead, but in the negative electrode of one embodiment, since the negative electrode tab is configured based on a carbon material, which is a non-metal component, it is difficult to apply such a welding method, and thereby a sufficient bondability cannot be obtained.

However, similarly to the specific embodiments above, as the negative electrode tab composed of the carbon layer is bonded to the metal lead by a conductive epoxy resin that exhibits excellent bondability to both the metal material and the carbon material, it was confirmed that excellent bondability between the two could be exhibited.

At this time, the kind of conductive epoxy resin applicable to the bonding between the negative electrode tab and the metal lead is not particularly limited, and any resin or composition thereof, previously known to exhibit excellent electrical conductivity and electrolyte resistance and to be usable for bonding conductive members to batteries, capacitors, devices, and the like, can be used. One example of such a conductive epoxy resin may include a resin composition including an epoxy resin that is cured at room temperature, e.g., 20 to 30° C. and exhibits bondability, and a conductive metal filler such as silver fine particles. In addition, it goes without saying that various epoxy resins or compositions thereof known to exhibit electrical conductivity and electrolyte resistance can be used.

On the other hand, the metal lead bonded to the above-mentioned negative electrode tab, specifically, the carbon layer thereof may be composed of copper and/or nickel, suitably an alloy of copper and nickel, depending on the configuration of a general battery.

Manufacturing Method of Lithium Metal Negative Electrode

On the other hand, according to another embodiment of the present disclosure, a method for manufacturing a negative electrode for a lithium secondary battery as described above can be provided. The method for manufacturing a negative electrode for a lithium secondary battery may include:

subjecting a crystalline carbon fabric containing plural carbon fibers to an oxygen plasma treatment to oxidize a surface of the crystalline carbon fabric to form a surface-oxidized crystalline carbon fabric;

reacting the surface-oxidized crystalline carbon fabric, a nitrogen precursor and a metal precursor to form a carbon fabric coated with a metal organic framework (MOF);

calcinating and carbonizing the carbon fabric coated with the metal organic framework at a temperature of 700° C. or more to form a carbonized carbon fabric; and electrochemically reacting the carbonized carbon fabric within the lithium salt-containing electrolyte, bonding the lithium ion or lithium carbide compound onto the carbonized carbon fabric and electrodepositing a lithium metal around the lithium ion or lithium carbide compound.

According to the manufacturing method of the other embodiment, the crystalline carbon fabric corresponding to the crystalline carbon layer can be subjected to an oxygen plasma treatment to oxidize the surface, and the surface-oxidized crystalline carbon fabric, a nitrogen precursor and a metal precursor can be reacted to form a carbon fabric coated with a metal organic framework (MOF). Then, as it is subjected to high-temperature calcination and carbonization to remove the metal organic framework, a carbon defect structure formed of electron-deficient carbon atoms and an amorphous carbon layer including the same can be formed in the corresponding portion where the metal organic framework has been formed.

Then, the carbonized carbon fabric is electrochemically reacted in an electrolyte containing lithium salt, the lithium ion or lithium carbide compound is intercalated onto the carbonized carbon fabric, and lithium metal is electrodeposited around them, so that it is possible to form a lithium ion source formed two-dimensionally in the amorphous carbon layer, which makes it possible to manufacture the negative electrode of one embodiment exhibiting the above-mentioned excellent characteristics.

In particular, as already described above, the lithium ions or lithium metal can be two-dimensionally intercalated and formed around the carbon defect structure in the amorphous carbon layer. Therefore, unlike an active material layer such as a lithium metal thin film that are three-dimensionally added separately, it functions as a lithium ion source for the negative electrode without causing the growth of three-dimensional protrusion-shaped lithium dendrite therefrom, so that the amorphous carbon layer can function as an active material layer by itself.

In the manufacturing method of the other embodiment, as the crystalline carbon fabric, for example, a carbon paper formed of carbon fibers having a diameter of 1 to 8 μm, or 3 to 5 μm can be used, and additionally, any other equivalent crystalline carbon fabric may be used without particular limitation.

Further, in the oxygen plasma treatment step, one or both surfaces of the crystalline carbon fabric can be surface-treated with oxygen plasma or mixed gas plasma in which oxygen and an inert gas such as argon is mixed, thereby performing surface oxidation, which makes it possible to define the portion where the metal organic framework and the carbon defect structure are formed later.

And, in the step of forming the carbon fabric coated with the metal organic framework, the type of the metal organic framework or the type of the nitrogen precursor and the metal precursor for the formation thereof are not particularly limited. This is because, in the manufacturing method of another embodiment, the metal organic framework is carbonized in a subsequent step to remove all remaining metals and organic components except carbon, and the carbon component also contributes only to the formation of a carbon defect structure.

However, a specific example of the metal organic framework that can be formed in the above step may include at least one compound selected from the group consisting of $Zn_2DOT$ (MOF-74), $Cu_2(BDC-Br)_2(H_2O)_2$ (MOF-101), $Zn_4O(BTB)_2$ (MOF-177), $[Fe_3O(BDC)_3(DMF)_3][FeCl_4]\cdot(DMF)_3$ (MOF-235), Al(OH)(BPYDC) (MOF-253), $Zn_4O(BDC)_3\cdot 7DEF\cdot 3H_2O$ (IRMOF-1 (MOF-5)), $Zn_4O(TPDC)_3\cdot 17DEF\cdot 2H_2O$ (IRMOF-16), $Zr_6O_6(BDC)_6$ (UiO-66), $Zr_6O_6(BPDC)_6$ (UiO-67), $Zr_6O_6(TPDC)_6$ (UiO-68), Al(OH)(BDC) (MIL-53), Al(OH)(BDC-$NH_2$) (MIL-53 (Al)—$NH_2$), $Fe_3O(MeOH)_3(O_2CCH=CHCO2)_3\cdot MeCO_2\cdot nH_2O$ (MIL-88A), $Fe_3O(MeOH)_3(O_2C(CH_2)2CO_2)_3\cdot AcO\cdot (MeOH)_{4.5}$ (MIL-88-Fe), $2Fe_3O(OH)(H_2O)_2(BDC-Me_2)_3$ (MIL-88B-4$CH_3$), $Fe^{III}_3O(H_2O)_2F\cdot(BTC)_2\cdot nH_2O$ (MIL-100-Fe), $Cr_3O(H_2O)_2F\cdot(BDC)_3\cdot nH2O$ (MIL-101), $Cu_3(BTC)_2$ (HKUST-1 (MOF-199)), $Gd_2(BDC-NH_2)_3(DMF)_4$ (LIC-10), $Zn(MIM)_2$ (ZIF-8), $Zn(FIM)_2$ (ZIF-90), $Cu_2(PZDC)_2(4,4'-BPY)$ (CPL-2), $[Cu(HFBBA)(phen)_2](H2HFBBA)_2(H_2O)(HCO_2)$ (F-MOF-1), and $Cu_{24}$(m-BDC)$_{24}$(DMF)$_{14}$(H$_2$O)$_{10}$ (MOP-1). In addition to this, all the various metal organic frameworks that can be formed on the carbon layer can be formed without particular limitation.

However, in order to properly form a carbon defect structure by the formation and carbonization of such a metal organic framework, a metal organic framework in the form of a metal zeolite-imidazole structure such as ZIF-8 can be preferably formed.

Further, those skilled in the art can appropriately select and use a nitrogen precursor and a metal precursor corresponding thereto according to the type of the metal organic frameworks. For example, in forming the metal organic framework in the form of the metal zeolite-imidazole structure, an imidazole-based compound such as methyl imidazole can be preferably used as a nitrogen precursor, and additionally, various nitrogen precursors can be selected and used according to the type of the above-mentioned metal organic frameworks.

Further, for the type of the metal precursor that reacts with the nitrogen precursor, those skilled in the art can obviously select and use an appropriate metal-containing compound according to the type of the above-mentioned metal organic frameworks.

Examples of the metal precursor include at least one metal-containing compound selected from the group consisting of zinc (Zn), aluminum (Al), copper (Cu), zirconium (Zr), iron (Fe), chromium (Cr), and gadolinium (Gd), and various salts, such as nitrates, hydroxides, or sulfates of these metals, or compounds in the form of hydrates and/or solvates thereof can be used without particular limitation.

On the other hand, in the step of forming the carbon fabric coated with the above-mentioned metal organic framework, the surface-oxidized crystalline carbon fabric, the nitrogen precursor, and the metal precursor can be reacted in water or a polar organic solvent such as methanol under stirring, and after the reaction, washing and drying steps using a polar organic solvent can also be further performed. Specific progress conditions of these washing and drying steps are specifically described in Examples described later.

On the other hand, after forming the carbon fabric coated with the metal organic framework, the carbon fabric can be calcinated and carbonized at a temperature of 700° C. or more, or 700 to 1300° C., or 800 to 1200° C. When such carbonization step is performed, the metal organic framework is carbonized and removed, and an amorphous carbon layer containing the carbon defect structure described above can be formed.

Thereafter, optionally, an inorganic impurity removal step using hydrochloric acid, a washing step, and a drying step may be additionally performed, the resultant is electrochemically reacted in a lithium salt-containing electrolyte, and a lithium ion or a lithium carbide compound is bonded and intercalated onto the carbonized carbon fabric, and by using lithium ions used as a nucleus, the lithium metal can be electrodeposited around them, thereby manufacturing the negative electrode of one embodiment.

This electrochemical reaction may proceed as a separate lithium ion intercalation reaction or lithium metal electrodeposition reaction during the manufacture of the negative electrode, but the reaction may be replaced by the progress of the initial charge/discharge step after the manufacture of the lithium secondary battery. For example, the lithium ions or lithium carbide compounds are bonded by an electrochemical reaction that occurs naturally during the process of the initial charge/discharge step, and intercalation of lithium ions and the like may occur therefrom.

On the other hand, after forming the negative electrode layer including the crystalline and amorphous carbon layers by the above-mentioned method, the negative electrode layer may be cut into a shape including a desired negative electrode plate and a negative electrode tab protruding therefrom, according to a general method of forming a negative electrode.

Subsequently, a conductive epoxy resin is coated onto the bonding part to the negative electrode tab, a metal lead is positioned on the epoxy resin, and then drying and curing are performed, thereby being able to bond the negative electrode tab and the metal lead. In this curing, the epoxy resin can be cured at room temperature at a temperature of 20 to 30° C., or alternatively, the epoxy resin can be cured under heating or pressure at a temperature of 50° C. or more, or 50 to 100° C. This makes it possible to manufacture a negative electrode in which the non-metal negative electrode tab and the metal lead are favorably bonded.

Lithium Secondary Battery

According to another embodiment of the present disclosure, a lithium secondary battery including the above-mentioned negative electrode is provided. The lithium secondary battery of another embodiment includes a positive electrode containing a positive electrode current collector and a lithium composite oxide-based positive electrode active material layer formed on the positive electrode current collector; the negative electrode of one embodiment described above; a separator between the positive electrode and the negative electrode; and an electrolyte.

The lithium secondary battery of another embodiment described above includes the negative electrode of the one embodiment described above, and thus can exhibit characteristics of fundamentally suppressing the growth of lithium dendrites and electrolyte decomposition reactions, while having excellent high-capacity and high-energy characteristics.

A description of the negative electrode applied to the lithium secondary battery is as described above, and the battery components other than the negative electrode will be described in detail below.

The electrolyte of the lithium secondary battery may be a liquid electrolyte (i.e., an electrolyte solution).

The electrolyte solution may include a non-aqueous organic solvent and a lithium salt.

The non-aqueous organic solvent serves as a medium through which ions involved in the electrochemical reaction of the battery can move.

As the non-aqueous organic solvent, a carbonate-based solvent, an ester-based solvent, an ether-based solvent, a ketone-based solvent, an alcohol-based solvent, or an aprotic solvent can be used. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methyl propionate, ethyl propionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like. In addition, the alcohol-based solvent may include ethyl alcohol, isopropyl alcohol, and the like, and the aprotic solvent may include nitriles such as R—CN (where R is a C2 to C20 linear, branched or cyclic hydrocarbon group, which may include a double bonded aromatic ring or an ether bond), amides such as dimethylformamide, dioxolanes such as 1,3-dioxolane, sulfolane, and the like.

The non-aqueous organic solvent may be used alone or in combination of one or more. The mixing ratio when one or more solvents are mixed and used can be appropriately adjusted according to the desired battery performance, which may be widely understood by those worked in the art.

Further, when the carbonate-based solvent is used, it is favorable to use cyclic carbonate and chained carbonate in a mixture thereof. In this case, the cyclic carbonate and the chained carbonate are mixed in a volume ratio of about 1:1 to about 1:9, so that the performance of the electrolyte can be excellently exhibited.

The electrolyte solution may further contain vinylene carbonate and/or an ethylene carbonate-based compound of the following Chemical Formula 2 in order to improve the battery lifespan:

[Chemical Formula 2]

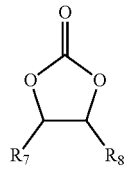

wherein in Chemical Formula 2, $R_7$ and $R_8$ are each independently hydrogen, a halogen group, a cyano group (CN), a nitro group ($NO_2$), or a C1-C5 fluoroalkyl group, and at least one of $R_7$ and $R_8$ is a halogen group, a cyano group (CN), a nitro group ($NO_2$), or a C1-C5 fluoroalkyl group.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound are further used, the lifespan may be improved by appropriately controlling the use amounts thereof.

In the electrolyte solution of the lithium secondary battery, the lithium salt is dissolved in the organic solvent to function as a lithium ion source in the battery, thereby enabling a basic operation of a lithium secondary battery of the one embodiment and promoting the movement of lithium ions between a positive electrode and a negative electrode.

As the lithium salt, in general, a lithium salt widely applied to an electrolyte can be used. For example, $LiPF_6$, $LiBF_4$, $LiSbF_6$, $LiAsF_6$, $LiC_4F_9SO_3$, $LiClO_4$, $LiAlO_2$, LiAlC$_4$, LiN(C$_x$F$_{2x+1}$SO$_2$)(C$_y$F$_{2y+1}$SO$_2$) (where x and y are natural numbers), LiCl, LiI, LiB(C$_2$O$_4$)$_2$ (lithium bis(oxalato) borate; LiBOB), or a combination thereof can be used.

Further, in the electrolyte solution, the concentration of the lithium salt may be controlled within the range of 0.1 to 5.0M. Within this range, the electrolyte solution may have an appropriate conductivity and viscosity, and lithium ions may effectively move in the lithium secondary battery. However, this is merely an example, and the invention is not limited thereby.

The electrolyte solution may be in the form of being impregnated in a porous separator disposed between the negative electrode and the positive electrode. Here, the separator separates the positive electrode and the negative electrode, and provides a passage for lithium ions to move, and any separator may be used without limitation as long as it is generally used as a separator in a lithium secondary battery. That is, a separator having excellent moisture-retention ability for an electrolyte solution while having low resistance to the movement of electrolyte ions can be used.

The separator may be, for example, selected from glass fibers, polyester, Teflon, polyethylene, polypropylene, polytetrafluoroethylene (PTFE), or combinations thereof, and may be a non-woven fabric or a woven fabric. For example, in the lithium secondary battery, a polyolefin-based polymer separator such as polyethylene, polypropylene, etc. is mainly used, and in order to secure heat resistance or mechanical strength, a coated separator containing a ceramic component or a polymer material may be used, and optionally, a single layer or a multilayer structure may be used.

Regardless of the electrolyte (electrolyte solution) of the lithium secondary battery, the positive electrode may include a positive electrode current collector and a positive electrode active material layer located on the positive electrode current collector.

The positive electrode is manufactured by mixing an active material and a binder, optionally a conductive material, a filler, and the like in a solvent to produce an electrode mixture slurry, and then coating this electrode mixture slurry onto each positive electrode current collector. Since the above-mentioned electrode manufacturing method is widely known in the art, a detailed description thereof will be omitted herein.

In the case of the positive electrode active material, there is no particular limitation as long as it is a lithium composite oxide-based material capable of reversibly intercalating and de-intercalating lithium ions. For example, it may include one or more of complex oxides of cobalt, manganese, nickel, or a combination of metals; and lithium.

In a more specific example, a compound represented by any of the following chemical formulas can be used as the positive electrode active material. Li$_a$A$_{1-b}$R$_b$D$_2$ (wherein 0.90≤a≤1.8 and 0≤b≤0.5); Li$_a$E$_{1-b}$R$_b$O$_{2-c}$D$_c$ (wherein 0.90≤a≤1.8, 0≤b≤0.5, and 0≤c≤0.05); LiE$_{2-b}$R$_b$O$_{4-c}$D$_c$ (wherein 0≤b≤0.5, 0≤c≤0.05); Li$_a$Ni$_{1-b-c}$Co$_b$R$_c$D$_\alpha$ (wherein 0.90≤a≤1.8, 0≤b≤0.5, 0≤c≤0.05 and 0<α≤2); Li$_a$Ni$_{1-b-c}$Co$_b$R$_c$O$_{2-\alpha}$Z$_\alpha$ (wherein 0.90≤a≤1.8, 0≤b≤0.5, 0≤c≤0.05 and 0<α<2); Li$_a$Ni$_{1-b-c}$Co$_b$R$_c$O$_{2-\alpha}$Z$_2$ (wherein 0.90≤a≤1.8, 0≤b≤0.5, 0≤c≤0.05 and 0<α<2); Li$_a$Ni$_{1-b-c}$Mn$^b$R$_c$D$_\alpha$ (wherein 0.90≤a≤1.8, 0≤b≤0.5, 0≤c≤0.05 and 0<α≤2); Li$_a$Ni$_{1-b-c}$Mn$_b$R$_c$O$_{2-\alpha}$Z$_\alpha$ (wherein 0.90≤a≤1.8, 0≤b≤0.5, 0≤c≤0.05 and 0<α<2); Li$_a$Ni$_{1-b-c}$Mn$_b$R$_c$O$_{2-\alpha}$Z$_2$ (wherein 0.90≤a≤1.8, 0≤b≤0.5, 0≤c≤0.05 and 0<α<2); Li$_a$Ni$_b$E$_c$G$_d$O$_2$ (wherein 0.90≤a≤1.8, 0≤b≤0.9, 0≤c≤0.5 and 0.001≤d≤0.1); Li$_a$Ni$_b$Co$_c$Mn$_d$G$_e$O$_2$ (wherein 0.90≤a≤1.8, 0≤b≤0.9, 0≤c≤0.5, 0≤d≤0.5 and 0≤e≤0.1); Li$_a$NiG$_b$O$_2$ (wherein 0.90≤a≤1.8 and 0.001≤b≤0.1); Li$_a$CoG$_b$O$_2$ (wherein 0.90≤a≤1.8 and 0.001≤b≤0.1); Li$_a$MnG$_b$O$_2$ (wherein 0.90≤a≤1.8 and 0.001≤b≤0.1); Li$_a$Mn$_2$G$_b$O$_4$ (wherein 0.90≤a≤1.8 and 0.001≤b≤0.1); QO$_2$; QS$_2$; LiQS$_2$; V$_2$O$_5$; LiV$_2$O$_5$; LiTO$_2$; LiNiVO$_4$; Li$_{(3-f)}$J$_2$(PO$_4$)$_3$ (0≤f≤2); Li$_{(3-f)}$Fe$_2$(PO$_4$)$_3$(0≤f≤2); and LiFePO$_4$.

In the above chemical formulas, A is Ni, Co, Mn or a combination thereof; R is Al, Ni, Co, Mn, Cr, Fe, Mg, Sr, V, a rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

Of course, it is also possible to use one having a coating layer on the surface of the above-mentioned compound, or it is possible to use a mixture of the above-mentioned compound with a compound having a coating layer. The coating layer may include a coating element compound such as coating element oxide, hydroxide, coating element oxyhydroxide, coating element oxycarbonate or coating element hydroxycarbonate. The compounds forming these coating layers may be amorphous or crystalline. As a coating element included in the coating layer, Mg, Al, Co, K, Na, Ca, Si, Ti, V, Sn, Ge, Ga, B, As, Zr or a mixture thereof can be used. As the coating layer forming process, any coating method can be used as long as it can be coated by a method (e.g., spray coating or dipping method, etc.) that does not adversely affect the physical properties of the positive electrode active material by using these elements in the compound. Since this is a content that may be widely understood by those worked in the art, and thus, detailed descriptions thereof will be omitted.

The positive electrode current collector is typically fabricated to a thickness of 3 to 500 μM. The positive electrode current collector is not particularly limited as long as it has high conductivity without causing a chemical change in the corresponding battery, and for example, may be formed of stainless steel, aluminum, nickel, titanium, baked carbon, or a material formed by surface-treating a surface of stainless steel or aluminum with carbon, nickel, titanium, silver, or the like. The current collector may have fine protrusions and depressions formed on a surface thereof to enhance adherence of a positive electrode active material, and may be formed in various forms such as a film, a sheet, a foil, a net, a porous body, a foaming body, and a non-woven fabric structure.

The conductive material is not particularly limited as long as it has high conductivity without causing a chemical change in the corresponding battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; carbon fluoride powder; metal powders such as aluminum powder, and nickel powder; conductive whiskers such as zinc oxide and potassium titanate; conductive metal oxides such as titanium oxide; conductive materials such as polyphenylene derivatives can be used.

The lithium secondary battery of the one embodiment may not only be used in a unit cell used as a power source for a small device, but also it can be used as a unit cell in a medium or large-sized battery module including a plurality of battery cells. Furthermore, a battery pack including the battery module may be configured.

Hereinafter, preferred examples of the present disclosure, comparative examples, and test examples for evaluating them are described. However, the following examples are only preferred examples of the present disclosure, and the present disclosure is not limited to the following examples.

Example 1: Manufacture of Negative Electrode for Lithium Secondary Battery

Carbon paper (HCP010N, Shanghai Hesen Electric Co. Ltd. USA) was purchased, and both front and back surfaces of the carbon paper were surface-oxidized using oxygen plasma treatment. At this time, the plasma treatment was carried out by a method of treating the plasma on the front surface and the back surface for 15 minutes, respectively, while flowing a mixed gas of oxygen and argon gas.

Next, at room temperature, the surface-oxidized carbon paper was placed in 100 ml of methanol in which 2-methyl imidazole (13.136 g, 8 eq) was dissolved, and the mixture was stirred for 6 hours. Then, 100 mL of methanol in which zinc nitrate hexahydrate (5.95 g, 1 eq) was dissolved was added to the solution, and then the mixture was stirred for 12 hours. Thereby, a carbon paper coated with a zinc-organic framework (ZLF-8) was formed.

After completion of the stirring, the carbon paper coated with zinc-organic framework was taken out and washed with stirring 3-5 times using pure methane.

Then, the carbon paper was kept and dried for 12 hours, in an oven at a temperature of about 80° C. and in a vacuum state. The process up to the drying was set to once, and the zinc-organic framework coating was repeated twice in total.

In order to carbonize the dried carbon paper, the carbon paper was heated up to 1000° C. at a temperature rising rate of 5° C. min$^{-1}$, and then calcinated and carbonized in a nitrogen atmosphere for 5 hours.

The carbonized carbon paper was stirred in a 2 M hydrochloric acid solution for 6 hours to remove impurity minerals (Zn). The carbon paper was taken out of hydrochloric acid, immersed in deionized water (DI), washed three times for 20 minutes each, and then finally dried in a vacuum oven at 70° C. for 7 hours.

The carbon paper thus prepared was subjected to an electrochemical reaction in a lithium salt-containing electrolyte under the conditions of Experimental Examples described later to prepare a negative electrode layer.

The negative electrode layer was cut so as to have the shape of a rectangular negative electrode plate of 4 cm*3.4 cm scale and a rectangular negative electrode tab of 1 cm*0.5 cm scale protruding from one side of the negative electrode plate as shown in FIG. 1.

On the cathode tab cut in this way, a commercially available conductive silver epoxy paste (trade name: EPO-TEK H21D) was evenly coated to a thickness of about 5 μm. Before the coated paste was dried, a copper/nickel alloy metal lead having a thickness of 100 μM was covered on the coated part, and then roll-pressed at room temperature (about 25° C.) under a pressure of 1 MPa, and finally heated in a vacuum oven at 80° C., 1 hr. Thereby, the negative electrode tab and the metal lead were bonded to manufacture the negative electrode of Example 1.

Example 2: Manufacture of Lithium Secondary Battery Including the Negative Electrode of Example 1

A separator (polypropylene-based porous polymer base material) was interposed between the negative electrode of Example 1 and the lithium metal reference electrode to manufacture a coin cell. An electrolyte solution, in which 1M LiPF$_6$ was dissolved in a mixed solvent of ethylene carbonate (EC)+diethyl carbonate (DEC)/fluoroethylene carbonate (FEC)/vinylene carbonate (VC) in a volume ratio of 89:10:1, was injected into the coin cell to manufacture a half-cell.

Examples 3 and 4: Manufacture of a Negative Electrode for Lithium Secondary Battery and a Lithium Secondary Battery The process up to the zinc-organic framework coating was carried out under the same methods and conditions as in Example 1.

Subsequently, in order to carbonize the dried carbon paper, the carbon paper was heated up to 700° C. at a temperature rising rate of 5° C. min$^{-1}$, and then calcinated and carbonized in a nitrogen atmosphere for 5 hours.

The carbonized carbon paper was stirred in a 2 M hydrochloric acid solution for 6 hours to remove impurity minerals (Zn). The carbon paper was taken out of hydrochloric acid, immersed in deionized water (DI), washed three times for 20 minutes each, and then finally dried in a vacuum oven at 70° C. for 7 hours.

The carbon paper thus prepared was subjected to an electrochemical reaction in a lithium salt-containing electrolyte under the conditions of Experimental Examples described later to prepare a negative electrode layer. Such negative electrode layer was subjected to cutting and bonding steps in the same manner as in Example 1 to manufacture the negative electrode of Example 3.

A half-cell of Example 4 was manufactured in the same manner as in Example 2, except that the negative electrode of Example 3 was applied instead of the negative electrode of Example 1.

Comparative Examples 1 and 2: Manufacture of Negative Electrode and Lithium Secondary Battery The carbon paper used as the first raw material in Example 1 was used as the negative electrode of Comparative Example 1, and cut and bonded with a metal lead. A lithium secondary battery containing this instead of the negative electrode of Example 1 was manufactured in the same manner as in Example 2, which was used as the lithium secondary battery of Comparative Example 2.

Experimental Example 1: SEM and TEM Analysis of the Surface of the Negative Electrode The surfaces of the negative electrodes for lithium secondary batteries manufactured in Comparative Example 1 and Example 1 were analyzed by SEM and TEM, respectively, and the SEM and TEM images are shown in FIGS. 2a and 2b, respectively.

First, referring to FIG. 2a, it is confirmed through the SEM image that the negative electrode of Comparative Example 1 is an electrode in which fibers having a diameter of 3-5 μm were aggregated. In contrast, referring to FIG. 2b, it is confirmed that the negative electrode of Example 1 was formed of a network-shaped defective carbon layer on the fiber surface of the crystalline carbon layer.

Further, referring to the TEM image in FIG. 2a, in the electrode of Comparative Example 1, a 100 crystal plane, which is a regular carbon crystal plane, is observed (the 100 crystal plane has a lattice spacing of 0.341 nm), and it can be seen through FFT analysis that the electrode is composed of a crystalline carbon layer in which a very regular carbon arrangement exists. In contrast, referring to the TEM image in FIG. 2b, it can be seen that a plurality of defective layers having a thickness of about 1.03 nm were generated on the electrode surface of Example 1, and unlike Comparative Example 1, the FFT analysis showed that disordered and amorphous carbon was generated.

Experimental Example 2: EDS Analysis of Negative Electrode

The carbon paper and negative electrode were subjected to elemental analysis with EDS for each manufacturing step of Example 1, and the analysis results are show in FIGS. 3a to 3c along with their corresponding SEM images. The element content for each manufacturing step based on the analysis results is summarized in Table 1 below. During the EDS element analysis, in order to confirm whether the zinc-organic framework (ZLF-8) was formed and removed by carbonization during the manufacturing process, the contents of four elements of carbon, oxygen, nitrogen and zinc were analyzed.

Specifically, (a) the result of elemental analysis of carbon paper in the first raw material state (FIG. 3a), (b) the result of elemental analysis immediately before carbonization (FIG. 3b), and (c) the result of elemental analysis after the formation of the final negative electrode by carbonization (FIG. 3c) were discriminated and respectively summarized.

TABLE 1

|  | Weight % | | | |
| --- | --- | --- | --- | --- |
|  | Carbon | Oxygen | Nitrogen | Zinc |
| (a) raw material state | 97.48 | 2.52 | — | — |
| (b) immediately before carbonization | 87.67 | 2.31 | 6.97 | 3.05 |
| (c) final negative electrode after carbonization | 96.92 | 3.08 | 0.00 | 0.00 |

Referring to the elemental analysis results in Table 1 and FIGS. 3a to 4c, it was confirmed that by the reaction of the zinc precursor and the nitrogen precursor (methylimidazole) before the carbonization step, a zinc-organic framework is formed and coated onto the carbon paper, and then completely removed by carbonization and calcination, so that there is no residue in the final negative electrode.

Therefore, it was confirmed that the characteristics of the negative electrode finally formed in Example 1 depend only on the formation of a carbon defect structure, and not on the zinc-organic framework.

Experimental Example 3: Carbon Defect Structure of Negative Electrode and Nanopore Analysis (XPS, Raman Spectrum and BET Surface Analysis)

First, the negative electrodes formed in Comparative Example 1 and Example 1 were analyzed by XPS, and the analysis results are shown in FIG. 4. Referring to FIG. 4, it was confirmed that in Example 1, due to the process in which a zinc-organic framework was formed and coated, and then carbonized and removed, a large number of nanopores (vacancies) were formed on the electrode.

Further, from the results of XPS analysis of Comparative Examples 1 and Example 1, a carbon defect structure including electron-deficient carbon atoms, particularly, a separate peak (non-conjugated C peak) derived from the nanopores was confirmed. In particular, the analysis result of Example 1 showed that the intensity ratio of a separate peak derived from such a carbon defect structure/a peak derived from a carbon having a sp2 orbital hybridization structure (normal carbon having no electron deficiency state) is 0.403, which appears strong as compared with Comparative Example 1 in which this intensity ratio is 0.175.

Through this, it was confirmed that a carbon defect structure including nanopores and electron-deficient carbon atoms was formed at a high density in the electrode of Example 1.

Meanwhile, the negative electrodes formed in Comparative Example 1 and Example 1 were subjected to Raman spectrum analysis, respectively, and the analysis results are shown in FIG. 5.

Referring to FIG. 5, it was confirmed that in the electrode of Example 1, a peak of 1100 to 1500 cm$^{-1}$ derived from the carbon defect structure (D band; a peak derived from electron-deficient carbon of the carbon defect structure) shows an intensity greater than or equal to the peak (G band; peak derived from normal carbon having a graphitic structure) observed at more than 1500 cm$^{-1}$ and less than 2000 cm$^{-1}$, and their intensity ratio, defined as $I_D/I_G$ ratio, is as high as 1.124. In contrast, in the electrode of Comparative Example 1, it was confirmed that the intensity ratio of the peak defined by the $I_D/I_G$ ratio is as low as 0.788.

From the results of Raman spectrum analysis, it was confirmed that in the negative electrode of Example 1, electron-deficient carbon atoms and carbon defect structures including them were formed in a considerable proportion and at a high density on the amorphous carbon layer.

In addition, from the results of Raman spectrum analysis of Example 1, a 2D peak for determining the number of graphene layers was additionally confirmed with considerable intensity in the vicinity of about 2700 cm$^{-1}$. Such a peak was not confirmed in Comparative Example 1. From the point that this 2D peak appears with an intensity ratio of about 0.34 compared to the G peak, it was confirmed that the amorphous carbon layer included in the electrode of Example 1 is formed into a shape including a plurality of graphene layers. For reference, it is known that a value with a 2D/G ratio of about 4 usually means a single layer graphene, and a value of 1 or less means a multilayer graphene.

Finally, the electrode surfaces of Example 1 and Comparative Example 1 were subjected to BET analysis, and the results are shown in FIG. 6. More specifically, BET pore analysis was performed using nitrogen adsorption. Referring to FIG. 6, it can be confirmed that in the electrode of Comparative Example 1, pores between 20~120 nm are developed, and that in the electrode of Example 1, nanopores having a size of about 1.1 nm are mainly developed. It was confirmed that the nanopores of Example 1 correspond to the high-density carbon defect structure confirmed from the XPS and Raman spectrum analysis results.

Experimental Example 4: Evaluation of the Degree of Electrolyte Decomposition Reaction First, an electrochemical reaction was carried out using the batteries of Examples 2, 4 and Comparative Example 2 under the conditions of 1.0 mA cm$^{-2}$ with 0 V voltage cut-off. Lithium ions were intercalated into the negative electrodes of Examples 1, 3 and Comparative Example 1, and then subjected to deintercalation. The results are shown in FIG. 7. Referring to FIG. 7, it was confirmed that in Examples 2 and 4, the intercalation-deintercalation coulombic efficiency of lithium ions in the first cycle was about 85% and about 73.2%, respectively, which appeared higher than 69.7% of Comparative Example 2. From this, it was confirmed that the electrolyte decomposition reaction consumed for the formation of the solid electrolyte interphase (SEI) first accumulated on the surface of the negative electrode can be greatly suppressed in Examples.

In addition, the electrode surface after the first cycle was analyzed by TEM-EDS, respectively, and the results are shown in FIG. 8a (Comparative Example 2) and FIG. 8b (Example 2), respectively. Referring to FIGS. 8a and 8b, it was confirmed that in Comparative Example 2, the solid electrolyte interphase by the electrolyte decomposition reaction have a thickness of about 40~55 nm, whereas in Example 2, the solid electrolyte interphase was confirmed to be about 10~25 nm, confirming that the electrolyte decomposition reaction was greatly reduced.

Experimental Example 5: Evaluation of Electrode Surface State after Lithium Metal Electrodeposition First, an electrochemical reaction was carried out using the batteries of Example 2 and Comparative Example 2 under the conditions of 1.0 mA cm$^{-2}$ of 5µ Ah cm$^{-2}$, 3 mAh cm$^{-2}$ and 9 mAh cm$^{-2}$, lithium ions were intercalated into the negative electrodes of Example 1 and Comparative Example 1, and lithium metal was subjected to electrodeposition. After this reaction, the electrode surface states of Comparative Example 2 and Example 2 were analyzed by SEM, and the results are shown in FIGS. 9a and 9b, respectively. For reference, the first image in each figure is a SEM image where the intercalation and electrodeposition reaction proceeded under 5µ Ah cm$^{-2}$, and the second image under 3 mAh cm$^{-2}$, and the third and fourth images under 9 mAh cm$^{-2}$.

Referring to the first and second images in FIG. 9a, it can be seen that in Comparative Examples, lithium aggregates in the vertical direction on each carbon fiber and grows dendritic, and referring to the third and fourth images, it can be seen that at a capacity of 9 mAh cm$^{-2}$, the grown lithium dendrites block the entire upper surface of the electrode, and lithium with a thickness of about 17 µm accumulates in a place where lithium ions often move (mass transport often occurs) without filling the inside of the electrode one after another.

In contrast, referring to FIG. 9b, it can be seen that in Examples, lithium nuclei are uniformly grown two-dimensionally over the entire area of the electrode (first to second images), and that even at 9 mAh cm$^{-2}$, the inside of the electrode is densely charged without substantially blocking the top surface of the electrode.

Experimental Example 6: Performance Evaluation of Lithium Secondary Battery

The cell performance of the lithium secondary batteries of Example 2 and Comparative Example 2 was evaluated, and the results are shown in FIGS. 10a and 10b, respectively. For reference, FIG. 10a shows the results of the full-cell test under the condition of excess electrolyte of 100 µl, and FIG. 10b shows the results of the full-cell test under lean electrolyte condition of 17 µl (4.0 µl mAh$^{-1}$). For reference, the results of each evaluation are shown in comparison with a reference in which a negative electrode is formed only with a copper current collector.

Referring to FIG. 10a, it was confirmed that Reference and Comparative Example 2 cause continuous lithium source consumption due to non-uniform electrodeposition morphology and dead-Li formation even under excessive electrolyte conditions, and show a rapid decrease in discharge capacity. In contrast, it was confirmed that the battery of Example 2 showed an excellent discharge capacity retention rate at the initial stage.

In addition, referring to FIG. 10b, since the batteries of Reference and Comparative Example 2 consume a large amount of initial electrolyte for immobilizing the current collector, they show an unstable discharge capacity profile from the initial cycle, whereas since the battery of Example 2 does not consume a large amount of initial electrolyte for immobilizing the current collector, it exhibits stable cycle characteristics. In addition, it was confirmed that since it has an electrodeposition morphology in which the formation of dead-Li is difficult, it exhibits excellent discharge capacity even under lean conditions.

Experimental Example 7: Evaluation of Bondability Between Negative Electrode Tab and Metal Lead In the negative electrode of Example 1, a sample of the bonded part between the negative electrode tab and the metal lead was prepared, an increasing load was applied at a speed of 200 mm/min using an adhesive strength test device (AGS-1kNX model manufactured by SHIMADZU, Japan), and the adhesive strength of the bonded part was measured. From these measurement results, when an adhesive strength of 1.3 kgf/5 mm or more appears, it was evaluated that the negative electrode tab and the metal lead are favorably bonded.

As a result of the evaluation of the negative electrode of Example 1, it was confirmed that the adhesive strength of 1.3 kgf/5 mm or more appears, and it was evaluated that the bondability between the negative electrode tab and the metal lead is excellent.

The invention claimed is:

1. A negative electrode for a lithium secondary battery, the negative electrode comprising:
   a negative electrode plate comprising:
      a crystalline carbon layer,
      an amorphous carbon layer having a network structure on the crystalline carbon layer, and
      a lithium ion or lithium carbide compound intercalated into the amorphous carbon layer, and a lithium metal electrodeposited around the lithium ion or lithium carbide compound;
   a negative electrode tab protruding from the negative electrode plate and comprising a crystalline carbon layer and an amorphous carbon layer identical to those of the negative electrode plate; and
   a metal lead adhered to the negative electrode tab with a conductive epoxy resin,
   wherein the metal lead comprises an alloy of copper and nickel, and the metal lead and at least one of the carbon layers of the negative electrode tab are adhered by the conductive epoxy resin.

2. The negative electrode for the lithium secondary battery according to claim 1, wherein:
   the amorphous carbon layer of the negative electrode plate comprises a carbon defect structure of electron-deficient carbon atoms, and
   nanopores ranging in diameter from of 0.5 nm to 2 nm are present in the carbon defect structure.

3. The negative electrode for the lithium secondary battery according to claim 2, wherein:
the amorphous carbon layer of the negative electrode plate comprises the carbon defect structure as observed in a transmission electron microscopy image, and
when the amorphous carbon layer of the negative electrode plate is analyzed by X-ray photoelectron spectroscopy, a ratio of a peak intensity from the carbon defect structure divided by a peak intensity from carbon having $sp^2$ orbital hybridization structure is 0.3 or more.

4. The negative electrode for the lithium secondary battery according to claim 3, wherein:
when the amorphous carbon layer of the negative electrode plate is subjected to Raman spectrum analysis, a peak of 1500 $cm^{-1}$ or less from the carbon defect structure shows an intensity equal to or greater than the peak observed at more than 1500 $cm^{-1}$ and 2000 $cm^{-1}$ or less.

5. The negative electrode for the lithium secondary battery according to claim 4, wherein:
the amorphous carbon layer of the negative electrode plate comprises a plurality of graphene layers, and
the result of the Raman spectrum analysis shows an additional peak in a region of 2500 $cm^{-1}$ or more from the plurality of graphene layers.

6. The negative electrode for the lithium secondary battery according to claim 1, wherein:
the crystalline carbon layer of the negative electrode plate comprises a plurality of carbon fibers and the crystalline carbon layer of the negative electrode plate has a thickness of 1 μm to 50 μm.

7. The negative electrode for the lithium secondary battery according to claim 1, wherein:
the amorphous carbon layer of the negative electrode plate has a thickness of 1 nm to 100 nm.

8. The negative electrode for the lithium secondary battery according to claim 1, wherein:
the lithium ion or lithium carbide compound, and the lithium metal are two-dimensionally bonded on the same plane as the amorphous carbon layer of the negative electrode plate.

9. The negative electrode for the lithium secondary battery according to claim 2, wherein:
lithium derived from the lithium ion or lithium carbide compound provides electrons to the electron-deficient carbon atoms, and is bonded to the carbon defect structure.

10. The negative electrode for the lithium secondary battery according to claim 9, wherein:
the lithium carbide compound is $Li_3C_8$.

11. The negative electrode for the lithium secondary battery according to claim 1, wherein:
the conductive epoxy resin comprises a curable epoxy resin and a conductive metal filler.

12. The negative electrode for the lithium secondary battery according to claim 1,
further comprising a metal current collector that supports the crystalline carbon layer of the negative electrode plate.

13. A method for manufacturing the negative electrode according to claim 1, the method comprising:
subjecting a crystalline carbon fabric comprising plural carbon fibers to an oxygen plasma treatment to oxidize a surface of the crystalline carbon fabric to form a surface-oxidized crystalline carbon fabric;
reacting the surface-oxidized crystalline carbon fabric, a nitrogen precursor and a metal precursor to form a carbon fabric coated with a metal organic framework;
calcinating and carbonizing the carbon fabric coated with the metal organic framework at a temperature of 700° C. or more to form a carbonized carbon fabric; and
electrochemically reacting the carbonized carbon fabric within a lithium salt-containing electrolyte, bonding the lithium ion or lithium carbide compound onto the carbonized carbon fabric and electrodepositing the lithium metal around the lithium ion or lithium carbide compound.

14. The method for manufacturing the negative electrode according to claim 13, wherein the metal precursor comprises at least one metal-containing compound selected from the group consisting of zinc (Zn), aluminum (Al), copper (Cu), zirconium (Zr), iron (Fe), chromium (Cr), and gadolinium (Gd).

15. The method for manufacturing the negative electrode according to claim 13, wherein the metal organic framework is at least one compound selected from the group consisting of $Zn_2DOT$, $Cu_2(BDC-Br)_2(H_2O)_2$, $Zn_4O(BTB)_2$, $[Fe_3O(BDC)_3(DMF)_3][FeCl_4]·(DMF)_3$, $Al(OH)(BPYDC)$, $Zn_4O(BDC)_3·7DEF·3H_2O$, $Zn_4O(TPDC)_3·17DEF·2H_2O$, $Zr_6O_6(BDC)_6$, $Zr_6O_6(BPDC)_6$, $Zr_6O_6(TPDC)_6$, $Al(OH)(BDC)$, $Al(OH)(BDC-NH_2)$, $Fe_3O(MeOH)_3(O_2CCH\!=\!CHCO2)_3·MeCO_2·nH_2O$, $Fe_3O(MeOH)_3(O_2C(CH_2)2CO_2)_3·AcO·(MeOH)_{4.5}$, $2Fe_3O(OH)(H_2O)_2(BDC-Me_2)_3$, $Fe^{III}_3O(H_2O)_2F·(BTC)_2·nH_2O$, $Cr_3O(H_2O)_2F·(BDC)_3·nH2O$, $Cu_3(BTC)_2$, $Gd_2(BDC-NH_2)_3(DMF)_4$, $Zn(MIM)_2$, $Zn(FIM)_2$, $Cu_2(PZDC)_2(4,4'-BPY)$, $[Cu(HFBBA)(phen)_2](H2HFBBA)_2(H_2O)(HCO_2)$, and $Cu_{24}(m-BDC)_{24}(DMF)_{14}(H_2O)_{10}$.

16. A lithium secondary battery comprising:
a positive electrode comprising a positive electrode current collector and a lithium composite oxide-based positive electrode active material layer on the positive electrode current collector;
the negative electrode of claim 1; and
a separator between the positive electrode and the negative electrode; and
an electrolyte.

* * * * *